April 3, 1928.                          1,664,543
                    L. EASTERMAN
                 JOINT FOR GLASS PLATES
                   Filed Oct. 12, 1926
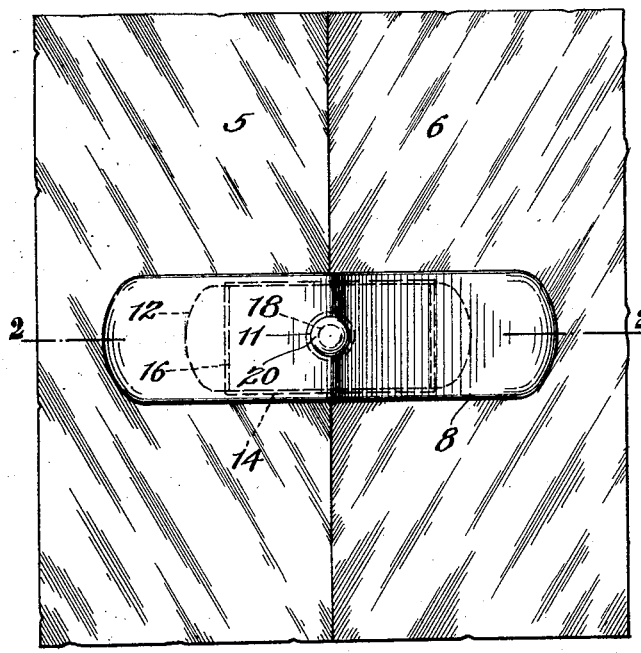
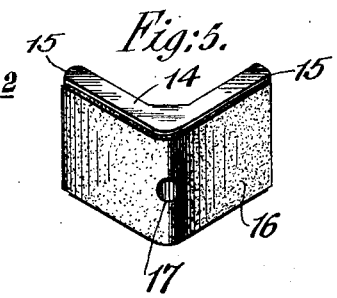
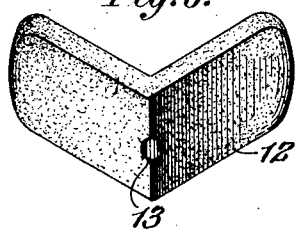
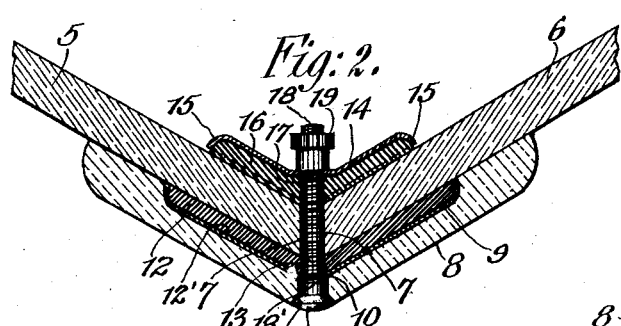
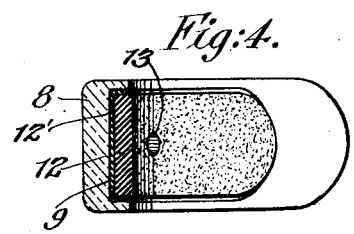
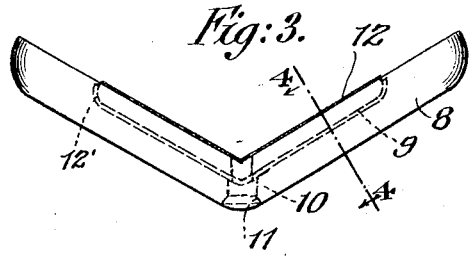
INVENTOR
Lea Easterman
BY C. P. Gepel
ATTORNEY.

Patented Apr. 3, 1928.

1,664,543

UNITED STATES PATENT OFFICE.

LEA EASTERMAN, OF BROOKLYN, NEW YORK.

JOINT FOR GLASS PLATES.

Application filed October 12, 1926. Serial No. 141,073.

This invention relates to joints for glass plates, and more particularly to such joints as are employed for holding the abutting edges of plate glass such as is used in show windows and show cases in tight contacting relation with each other and the subject matter of the present application has particular reference to certain improvements in a device of this character as shown and described in Patent No. 1,590,890, issued to me on June 29, 1926.

It is the primary object and purpose of my present invention to provide a joint device for such glass plates which may be very easily and quickly applied, and which is so constructed as to automatically seal the joint at the point of application and effectually prevent the seepage of water therethrough, and which will also automatically compensate for expansion and contraction of the parts.

It is a more particular object of the invention to provide such a joint device embodying a relatively narrow outer transparent member adapted to extend over the angularly related faces of the adjacent glass plates at their abutting edges, together with an inner relatively yieldable metallic member and resilient or elastic cushioning means associated with said inner and outer members and coacting therewith and with the corresponding faces of the glass plates. These inner and outer members are preferably connected by a bolt having a threaded shank adapted to be positioned through suitably formed mating recesses in the edges of the glass plates and through openings in the resilient cushions and having a nut threaded on its inner end cooperating with said inner member. Thus by proper adjustment of this nut, the resilient cushions are compressed against the faces of the glass plates and the material of said cushions is directly interlocked with the threads of the connecting bolt which provides an extensive area of frictional contact, resisting any tendency of casual rotation of said bolt whereby the joint would be loosened.

It is also a further general object of the invention to provide a device of the above character which in comparison with the devices of the prior art used for this purpose, is relatively simple and may therefore, be manufactured and sold at comparatively small cost.

With the above and other objects in view, the invention consists in the improved glass plate joint, and in the form, construction and relative arrangement of its several parts as will be hereinafter more fully described, illustrated in the accompaying drawings, and subsequently incorporated in the subjoined claims.

In the drawing, wherein I have illustrated one simple and practical embodiment of the device, and in which similar reference characters designate corresponding parts throughout the several views,—

Figure 1 is a front elevation of adjacent angularly related window plates showing my improved joint applied thereto;

Fig. 2 is a horizontal sectional view taken on the line 2—2 of Fig. 1;

Fig. 3 is a detail plan view of the outer joint member;

Fig. 4 is a sectional view taken on the line 4—4 of Fig. 3;

Fig. 5 is a detail perspective view of the inner joint member and its cushioning element, and Fig. 6 is a detail perspective view of the cushioning element associated with the outer joint member.

Referring in detail to the drawing, 5 and 6 respectively, indicate two sheets of plate glass such as is used in the construction of show windows, opposed edges of said glass plates being suitably beveled or mitered and adapted for abutting contact with each other at one corner of the window. At properly spaced points vertically of these abutting edges of the glass plates, the said edges are provided with mating transversely extending semi-circular recesses indicated at 7.

Each of the improved joints to be applied in the manner hereinafter described, in the construction selected for purposes of illustration, includes an outer member 8 which is also of glass. As herein shown, this member is of narrow elongated form, of suitable thickness and has portions of similar length and shape extending at an obtuse angle to each other from the center of said member. In other words, said member is of shallow V-shaped form in plan, the angular relation of the diverging parts of said member corresponding substantially with the angular relationship of the outer faces of the glass plates 5 and 6 with respect to each other. The ends of the member 8 may be rounded as shown or of any other desired ornamental shape.

The outer joint member 8 is provided in its inner face with a recess or cavity indicated at 9 which extends from the center of said member for a portion of the length of each of the diverging parts thereof. With this cavity, at the center of the member 8 a transverse opening 10 communicates, the outer end of said opening being formed with a countersink indicated at 11.

Within the cavity or recess 9, a pad 12 of rubber or other resilient cushioning material is frictionally fitted. As herein shown, this pad 12 is preferably positioned within a shallow dished or channel shaped plate 12' which is of sheet metal and yieldable under pressure. This plate is of such dimensions that it may have a relative sliding movement on the face of the cavity or recess 9. Normally, the pad 12 projects beyond the plane of the inner face of the member 8 as clearly shown in Figs. 3 and 4 of the drawings and is centrally provided with the opening 13 coinciding with the opening 10 of the member 8.

The inner member of the improved joint device consists of a shallow V-shaped plate 14 of resilient sheet metal of suitable gauge. The diverging portions of this plate terminate in the rounded or concavo-convex flanges 15 and the body of said plate is also provided with flanges on its upper and lower edges. Between these flanges a resilient cushioning pad 16 of rubber or other suitable material is held, the said pad also normally projecting beyond the edges of the flanges on said plate. The body of the plate 14 is provided with an opening therein coinciding with the opening 17 centrally formed through the pad 16.

The connecting bolt 18 between the inner and outer joint members has a long threaded shank adapted for insertion from the outside through the opening 10 of the member 8 and the recesses 7 in the glass plates and through the coinciding openings in the cushioning pads 12 and 16. A suitable nut 19 is threaded upon the inner end of said bolt. The plate 12' has threaded engagement with the bolt 18 while the plate 14 is loose upon said bolt. This bolt in spaced relation to the head 20 is provided with an annular stop shoulder indicated at 18' adapted to abut against the plate 12'. Thus, as the nut 19 is adjusted and the bolt 18 drawn axially through the central opening in the member 8, the plate 14 with the pad 16 is urged against the inner faces of the glass plates 5 and 6 while the plate 12' and the pad 12 are urged towards the outer faces of said glass plates. Thus, it will be understood that the mechanical strains are borne entirely by the two plates 12' and 14 and not by the outer glass member 8. This member is prevented from rotating or turning on the end of the bolt 18 by reason of the fact that the plate 12' with its pad 12 is positioned within the cavity provided in the inner face of said member. The outer end of the bolt is formed with the head 20 adapted to seat in the countersink 11 and having a rounded or convex end face which is substantially flush with and constitutes a continuation of the outer face or surface of the member 8 when the bolt is finally tightened and the joint completed. It will be obvious that upon adjusting the nut 19 against the rear side of the member 14, the member 8 is drawn up tightly by the bolt until the opposite ends thereof contact against the faces of the glass plates 5 and 6, and in such tightening action the resilient cushioning material 12 is compressed within the recess 9. The forces of compression tend to crowd this material towards the bolt 18 where such material is forced into interlocking engagement with the threads on said bolt. At the same time, the cushioning material 16 of the joint member 14 is likewise compressed against the inner faces of the two glass plates and the material thereof is likewise interlocked with the threads of the bolt. However, since the sheet metal member 14 is more or less yielding to such pressure, the flanged edges of this member do not contact against the faces of the glass plates. This may permit of a slight relative movement of the edges of the glass plate at the joints when severe pressures are momentarily sustained by said plates, while under normal conditions an absolutely tight and secure joint will be maintained. Likewise, the provision of these cushioning pads associated with the inner and outer members renders the joint automatically responsive to such slight expansion or contraction of the parts as may occur.

From the foregoing description considered in connection with the accompanying drawings, it will be seen that my novel form of joint for glass window plates consists of relatively few parts which can be very easily and quickly assembled and applied. It will be apparent that in such application of the joint, the grooves or channels 7 in the edges of the glass plates are tightly sealed both at the inner and outer sides of said plates so that the possibility of rain or moisture entering to the interior of the window is effectually precluded. These mating recesses 7 may therefore, be of somewhat greater diameter than the bolt 18 so that they will permit of the easy passage of the bolt therethrough in making the connection between the inner and outer joint members and also permit expansion or contraction of the parts to take place without subjecting the same to strains and stresses which would be likely to cause breakage. Owing to the simplicity of this device, it will be apparent that the parts thereof can be fabricated at comparatively low manufacturing cost and that the joint device as a whole can be produced and sold at less cost to the purchaser than devices of this character heretofore used in the art.

I have herein described and illustrated an embodiment of my present improvements which I have found to be entirely satisfactory in practical operation, nevertheless, it is to be understood that the essential features of the invention might also be exemplified in various other alternative mechanical structures, and I accordingly, reserve the privilege of resorting to all such legitimate changes therein as may be fairly incorporated within the spirit and scope of the invention as claimed.

I claim:

1. A joint fastening device for glass window plates in abutting relation, comprising a pair of opposed metallic members adapted to be disposed respectively at the inner and outer sides of the glass plates, resilient cushioning pads disposed in recesses in the opposing surfaces of said metallic members, said pads being adapted to bear against the surfaces of the glass plates, a transparent glass cover plate overlying the outer metallic member, and clamping means for imposing a clamping pressure between said metallic member, said clamping means holding the glass cover plate in position free from clamping pressure.

2. A joint fastening device for glass window plates in abutting relation, comprising a pair of opposed metallic members adapted to be disposed respectively at the inner and outer sides of the glass plates, resilient cushioning pads disposed in recesses in the opposing surfaces of said metallic members, said pads being adapted to bear against the surfaces of the glass plates, a transparent glass cover plate overlying the outer metallic member, and provided on its inner surface with a recess for snugly seating said outer metallic member, a clamping bolt having a threaded shank extending through said opposed metallic members and the glass window plates, said bolt having a shouldered head on its outer end bearing against the outer metallic member, and a portion of said head being adapted to maintain the glass cover plate in position without clamping strains, and a nut on the inner end of said bolt to co-operate therewith in effecting the clamping action between the metallic members.

3. A joint device for glass plates comprising an outer non-yielding joint member formed of glass and having a cavity in the inner face thereof, a resilient cushioning pad in said cavity and normally projecting slightly beyond the plane of the inner faces of said outer joint member, an inner yieldable metallic joint member, a resilient cushioning pad carried by the latter joint member to directly engage the inner faces of the glass plates and prevent contact of said joint member therewith, a connecting bolt adapted for insertion through registering openings in said joint members and the cushioning pads, and a nut threaded upon the inner end of said bolt to directly coact with the inner joint member and thereby compress said cushioning pads against the inner and outer surfaces of the glass plates, said bolt being threaded for substantially its entire length, said resilient cushioning pads under the forces of compression being interlocked with the threads of said bolt, and means to transmit the compression strain of the bolt to the outer sides of the glass plates independently of the outer transparent joint member.

4. A joint device for glass plates comprising an outer transparent rigid joint member formed of glass and having a cavity in its inner face, a resilient cushioning pad in said cavity normally projecting beyond the plane of the inner face of said member and adapted to engage the outer faces of the glass plates at their abutting edges, an inner yieldable metallic joint member of shallow channel shaped cross-section, a resilient cushioning pad held therein and normally projecting beyond the edges of the channel flanges to directly engage the inner faces of the glass plates, a connecting bolt adapted for insertion through said joint members and the cushioning pads and threaded substantially for its entire length, a nut engaged upon the inner end of said bolt to directly coact with the inner joint member and compress the cushioning pads against the faces of the glass plates and force the material of said cushioning pads into interlocked engagement with the threads of said bolts, and means in the cavity of the outer joint member to transmit the compression strain of the bolt to the outer sides of the glass plates independently of the outer transparent joint member.

5. A joint device for glass plates comprising an outer transparent rigid joint member formed of glass and having a cavity in its inner face, a yieldable metal plate disposed within said cavity, a cushioning pad seated against said plate and normally projecting beyond the plane of the inner face of said member for engagement with the outer faces of the glass plates at their abutting edges, an inner metallic joint member and a cushioning pad held by said member against the inner faces of the glass plates, a connecting bolt adapted for insertion through said joint members and the cushioning pads, said bolt having a shoulder thereon to engage the metal plate in the cavity of said transparent joint member, and a nut engaged upon the inner end of said bolt to directly coact with the inner joint member, and said shoulder on the bolt exerting a tensioning strain upon said plate and the cushioning pad in the cavity of the transparent joint member independently of said outer transparent joint member.

In testimony that I claim the foregoing as my invention, I have signed my name hereto.

LEA EASTERMAN.